United States Patent [19]

Betts et al.

[11] Patent Number: 5,242,577

[45] Date of Patent: * Sep. 7, 1993

[54] RADIAL FLOW LIQUID SPRAYER FOR LARGE SIZE VAPOR FLOW LINES AND USE THEREOF

[75] Inventors: Paul J. Betts, Rockville Centre, N.Y.; Frank M. Buyan, Yardley, Pa.

[73] Assignee: Mobil Oil Corporation, Fairfax, Va.

[*] Notice: The portion of the term of this patent subsequent to Apr. 27, 2010 has been disclaimed.

[21] Appl. No.: 729,137

[22] Filed: Jul. 12, 1991

[51] Int. Cl.[5] .................. C10G 11/00; C10G 9/16; C10G 9/12

[52] U.S. Cl. .................. 208/157; 208/48 Q; 208/113

[58] Field of Search ............ 208/48 Q, 113, 157

[56] References Cited

U.S. PATENT DOCUMENTS

| | | | |
|---|---|---|---|
| 3,338,821 | 8/1967 | Moyer et al. | 208/113 |
| 4,980,051 | 12/1990 | Owen | 208/113 |
| 5,019,239 | 5/1991 | Owen | 208/48 Q |
| 5,043,058 | 8/1991 | Forgac et al. | 208/113 |
| 5,073,249 | 12/1991 | Owen | 208/48 R |

Primary Examiner—Theodore Morris
Assistant Examiner—P. L. Hailey
Attorney, Agent, or Firm—Alexander J. McKillop; Malcolm D. Keen; Richard D. Stone

[57] ABSTRACT

A process and apparatus for spraying a liquid into a flowing vapor stream is disclosed. Multiple nozzles for injection of a liquid are radially distributed about a pipe containing a flowing vapor stream. The nozzles are arranged so that the cone shaped spray pattern from the nozzles is at least in part parallel to and near the pipe wall. The number of nozzles, and the spray pattern of each, provides 100% overlapping spray of liquid droplets within the pipe. The invention can be used to neutralize acidic vapor streams, absorb noxious fumes, or quench thermal reactions. The invention is especially useful in quenching hot vapor streams. Quenching hot cracked products from an FCC reactor in the transfer line improves yields, and permits higher catalytic cracking reactor temperatures.

15 Claims, 3 Drawing Sheets

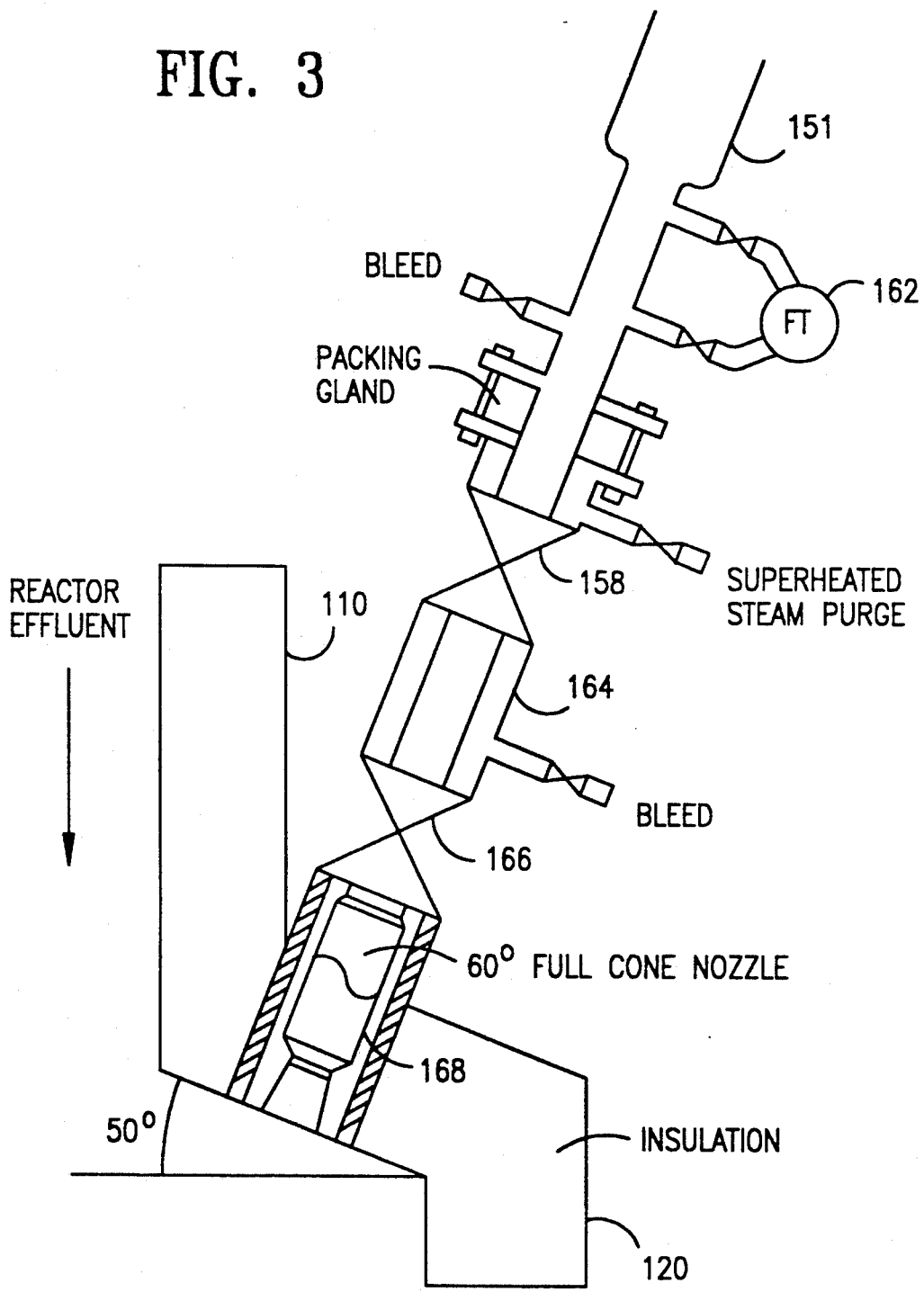

RADIAL FLOW LIQUID SPRAYER FOR LARGE SIZE VAPOR FLOW LINES AND USE THEREOF

BACKGROUND OF THE INVENTION

1. Field of the Invention

The field of the invention is addition of liquids to large size vapor flow lines. The invention is especially useful in quenching hot hydrocarbon vapor streams in refineries.

2. Description of Related Art

Efficient addition of a liquid to a flowing vapor stream is a problem in many industries, and especially critical in refineries and chemical plants.

Many chemical plants contain large inventories of hazardous materials which are essential for making products, but hazardous to the people people near the facility.

HF alkylation units contain a large inventory of liquid HF acid. In the event of a fire, or other plant upset, large volumes of HF acid containing vapors may be vented rapidly from a plant through large size vapor lines. It would be beneficial to have an efficient method of spraying a neutralizing liquid into a large size vent line associated with the unit.

Many amine treating units contain inventories of H2S, which may someday have to be vented to a flare system. It would be beneficial to have a way to absorb some of this material in the event the unit dumps its inventory of H2S into a vent line.

Many pesticides are made by processes which require use of toxic materials in large quantities, which may have to vented in the event of a fire or plant upset.

There is a therefore a need for an efficient way to contact large volumes of toxic gas with an absorbent or neutralizer. In addition to the chemical reactions, or absorption reactions, discussed above, there are many high temperature vapor streams in refineries and other high temperature processing units which must be quickly and efficiently cooled or quenched to stop a catalytic or thermal reaction. Catalytic cracking is an especially important example of a process where efficient quenching of hot vapor is needed.

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In moving bed cracking, the catalyst is in bead form. Feed contacts a moving bed of bead catalyst and is cracked into lighter products. The lighter products are removed from the reactor and charged via a transfer line to a distillation column, sometimes called the synthetic crude tower (Syntower) or the main column. In some moving bed units, the reactor effluent vapors were cooled in the transfer line just upstream of the main column, by injection of a recycle stream from the main column. Usually the liquid was injected by a single spray nozzle, which moved a lot of liquid quickly into the transfer line, but did only a fair job of contacting the liquid spray with the hot vapor. The reactor effluent was cooled so that no superheated vapor would enter the column, and coke in the column. Enough liquid was introduced into the transfer line just upstream of the main column to cool the effluent and produce a two phase mixture, which passed into the base of the main column.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.-600° C., usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. The trend of development of the fluid catalytic cracking (FCC) process has been to all riser cracking and use of zeolite catalysts.

Zeolite-containing catalysts having high activity and selectivity are now used in most FCC units. These catalysts work best when coke on the catalyst after regeneration is low, e.g., less than 0.3 wt %.

To regenerate FCC catalysts to these low residual carbon levels, and to burn CO completely to CO2 within the regenerator (to conserve heat and minimize air pollution) many FCC operators add a CO combustion promoter metal to the catalyst or to the regenerator.

U.S. Pat. Nos. 4,072,600 and 4,093,535, which are incorporated by reference, teach use of combustion-promoting metals such as Pt, Pd, Ir, Rh, Os, Ru and Re in cracking catalysts in concentrations of 0.01 to 50 ppm, based on total catalyst inventory.

Modern, zeolite based catalyst are so active that the heavy hydrocarbon feed can be cracked to lighter, more valuable products in much less time. Instead of dense bed cracking, with a hydrocarbon residence time of 20-60 seconds, much less contact time is needed. The desired conversion of feed can now be achieved in much less time, and more selectively, in a dilute phase, riser reactor.

Riser cracking is more selective than dense bed cracking. Refiners maximized riser cracking benefits, but in so doing induced, inadvertently, a significant amount of thermal cracking. Thermal cracking is not as selective as either riser cracking or dense bed cracking, and most refiners would deny doing any thermal cracking, while building and operating FCC units with all riser cracking which also did a significant amount of thermal cracking.

Thermal cracking was a by-product of upflow riser reactors, which discharged cracked products more than a 100 feet up, and product fractionators which charged the hot vapors from the FCC unit to the bottom of the main column. The transfer lines to connect the FCC kept getting longer, and the material exiting the riser reactor kept getting hotter, and the combination caused thermal cracking. The trend to heavier feeds only made things worse. Higher temperatures were sought to crack the heavy feed, and the heavy feeds contained more highly aromatic material that wanted to thermally degrade to form coke or other undesired species.

The reasons for high risers in FCC, and for adding hot vapor to the bottom of the FCC main column will be briefly reviewed. After this, some other work on minimizing thermal cracking in riser cracking FCC units will be reviewed.

Risers are tall because of high vapor velocities and residence time. The FCC riser operates in dilute phase flow. There is better distribution of catalyst across the riser when vapor velocities are fairly high. Many FCC riser reactors now operate with vapor velocities on the order of 20–50 feet per second. To achieve enough residence time in the riser, the riser must be very tall. For a 2 second hydrocarbon residence time, the riser must be at least 100 feet long with a 50 fps vapor velocity. There usually must be additional space provided at the base of the riser reactor to add catalyst and more space for feed nozzles. The cracked vapor products exit the riser and enter a reactor vessel, at an elevation more than 100 feet in the air, for separation of spent catalyst from cracked products, usually in one or more stages of cyclone separation. The cracked products are eventually discharged, usually up, from the separation section, usually at an elevation well above the top of the riser, and charged to the base of the main column.

Hot vapors from the FCC unit are charged to the base of the main column for several reasons, but primarily so that the hot vapors may be used to heat the column. Another reason is that the hot vapors always contain some catalyst and catalyst fines, which are never completely removed in the FCC reactor, despite the use of multiple stages of cyclone separators. Adding the fines laden vapor to the bottom of the main column at least minimizes amount of fines that must circulate through the column. The fines are largely confined to the very base of the column. The lower trays or packing of the main column are designed to tolerate the fines, as with the using of sloping trays that permits fines to drain or be swept from a tray without clogging the tray.

The combination of high temperatures in the riser reactor, a tall riser reactor, and a bottom fed main column, give enough residence time to cause a significant amount of thermal cracking to occur.

As the FCC process and catalyst improved, refiners attempted to use the process to upgrade a wider range of feedstocks, in particular, feedstocks that were heavier.

These heavier, dirtier feeds have placed a growing demand on the reactor and on the regenerator. Processing resids exacerbated existing problem areas in the riser reactor, namely feed vaporization, catalyst oil contact, accommodation of large molar volumes in the riser, and coking in the transfer line from the reactor to the main fractionator. Each of these problem areas will be briefly discussed.

Feed vaporization is a severe problem with heavy feeds such as resids. The heavy feeds are viscous and difficult to preheat in conventional preheaters. Most of the heating and vaporization of these feeds occurs in the base of the riser reactor, where feed contacts hot, regenerated catalyst. Because of the high boiling point, and high viscosity, of heavy feed, feed vaporization takes longer in the riser, and much of the riser length is wasted in simply vaporizing feed. Multiple feed nozzles, fog forming nozzles, etc., all help some, but most refiners simply add more atomizing steam. Use of large amounts of atomizing steam helps produce smaller sized feed droplets in the riser, and these smaller sized drops are more readily vaporized. With some resids, operation with 3–5 wt % steam, or even more, approaching in some instances 5–10 wt % of the resid feed, is needed to get adequate atomization of resid. All this steam helps vaporize the feed, but wastes energy because the steam is heated and later condensed. It also adds a lot of moles of material to the riser. The volume of steam approaches that of the volume of the vaporized resid in the base of the riser. This means that up to half of the riser volume is devoted to steaming (and deactivating) the catalyst, rather than cracking the feed.

In many FCC units better feed vaporization is achieved by using a higher temperature in the base of the riser reactor, and quenching the middle of the riser or the riser outlet.

Catalyst/oil contact is concerned with how efficiently the vaporized feed contacts catalyst in the riser. If feed vaporization and initial contacting of catalyst and oil is efficient, then catalyst/oil contact will tend to be efficient in the rest of the riser as well. High vapor velocities, and more turbulent flow, promote better contact of catalyst and oil in the riser. High superficial vapor velocities in the riser mean that longer risers are required to achieve the residence time needed to attain a given conversion of heavy feed to lighter components.

Large molar volumes are sometimes a problem when processing resids. This is because the heavy feeds, with an extremely high molecular weight, occupy little volume when first vaporized, but rapidly crack to produce a large molar expansion. Large amounts of vaporization steam add to the volume of material that must be processed in the riser, and addition of quench material to the riser, or to the riser outlet, all increase the volume of material that must be handled by the main column. More volume does not usually translate into reduced residence time in the transfer line connecting the cracked vapor outlet near the top of the FCC riser to the base of the main column. This is because refiners usually limit the vapor velocity in large vapor lines to 120 to 150 feet per second. Vapor velocities below this are used for several reasons, but primarily to control erosion and limit pressure drop. Erosion is a problem because of the presence of catalyst fines. Pressure drop is a problem, because it takes a lot of energy to transfer large volumes of material through a large pressure drop. High pressure drops in this transfer line, the line to the main column, would also increase the FCC reactor pressure, which is undesirable from a yield standpoint, and decrease the main column pressure which increases the load on the wet gas compressor associated with the main column.

Coking in the transfer lines connecting the FCC reactor vapor outlet with the main column refers to coke formation in this transfer line. FCC operators have long known that "dead spaces" in a line could lead to coke formation. Coke formation is a frequently encountered problem in the "dome" or large weldcap which forms the top of the vessel housing the riser reactor cyclones If oil at high temperature is allowed to remain stagnant for a long time, it will slowly form coke. For this reason refiners have routinely added a small amount of "dome steam", typically 500 #/hr, to prevent formation of coke in the dome of an FCC unit. Coking in the transfer line is somewhat related, in that coke will form in stagnant or dead areas of the transfer line. Coke will also form if there are cool spots in the transfer line. The cool spots allow some of the heaviest material in the reactor effluent vapor to condense. These heavy materials, some of which may be entrained asphaltenic materials, will form coke if allowed to remain for a long time in the transfer line. Thus refiners have tried to insulate the transfer line to the main column, not only to prevent heat loss to the atmosphere, but also to prevent coking in this line. The problem of coke formation gets more severe with either an increase in reactor/transfer line temperatures, or with a decrease in feed quality so that it contains more heavier materials.

Although great strides have been taken to improve many parts of the FCC process, such as better regenerators, better catalyst strippers, and better catalysts, the process has not been able to realize its full potential, especially with heavy feedstocks including non-distillable materials.

These trends, to high temperatures and high vapor velocity in the riser, and tall risers, all improved the cracking process and provided better yields of cracked products. These trends allowed FCC units to process significantly heavier feeds. These trends also caused unselective thermal cracking of the valuable cracked products, and increased the amount of energy needed to move cracked products from the reactor to the main column.

We examined the work that others had done, and realized that it was time for a new approach which would solve some of the problems in FCC processing, and be applicable in other services as well.

In FCC processing we wanted the benefits of short residence time riser cracking, without the unselective thermal cracking, coke formation in transfer lines, and excessive energy consumption associated with the conventional way of recovering cracked products from a FCC riser reactor vapors.

We wanted to be able to modify existing FCC units to eliminate transfer line coking or transfer line thermal reactions, without completely rebuilding the unit. We needed to cool the reactor effluent vapor, but did not want to waste the heat contained in the effluent vapor stream. We also wanted a system that would be reliable, could operate for years, be fail safe so that if it broke the unit could continue to operate.

We wanted a better way to add a quenching liquid to hot vapor streams, which would be useful in quenching the FCC transfer line, and that also would be useful in other processes, such as quenching the hot feed to a thermal process distillation column, quenching the hot feed to a moving bed cracking unit distillation column, or for better scrubbing of flue gas.

We developed a system which can be readily retrofitted into existing large process lines, which can be serviced while in use, and which is extremely tolerant of changes in vapor flow in the process line.

BRIEF SUMMARY OF THE INVENTION

Accordingly, the present invention provides a method of contacting a flowing gas stream in a generally tubular length of pipe having a pipe wall and a pipe inside diameter with a liquid comprising: providing a plurality of spray nozzle means having an inlet for a liquid to be injected into the flowing gas stream, an inlet for an atomizing fluid, and a nozzle discharge outlet which provides a uniform distribution of liquid droplets in a conical pattern having an angle of spray of 30 to 90 degrees; radially distributing the spray nozzle means about the length of pipe and inserting the spray nozzle means into the pipe so that the discharge ends of the nozzles are within 0.05 to 0.25 pipe diameters of the pipe wall, and the angle of insertion of the nozzles relative to a line parallel to the length of the pipe is no more than approximately one half the angle of the conical spray pattern.

In another embodiment, the present invention provides an apparatus for contacting a flowing gas stream in a generally tubular length of pipe having a pipe wall and a pipe inside diameter with a liquid comprising: a plurality of radially distributed spray nozzle means having an inlet for a liquid to be injected into the flowing gas stream, an inlet for an atomizing fluid, and a nozzle discharge outlet means which provides a uniform distribution of droplets in a conical pattern having an angle of spray of 30 to 90 degrees; wherein said spray nozzle means are inserted into the pipe so that the discharge ends of the nozzles are within the pipe and within 0.05 to 0.25 pipe diameters of the pipe wall, and wherein the angle of insertion of the nozzles relative to a line parallel to the length of the pipe is approximately one half the angle of the conical spray pattern means, whereby at least a portion of the pattern of the conical spray pattern is parallel to and within 0.05 to 0.25 pipe diameters of the pipe wall; and wherein the number of spray nozzle means, and the angle of the conical spray pattern of each nozzle are sufficient to provide at least 100% overlap of conical spray patterns within said pipe.

In another embodiment, the present invention provides in a fluidized catalytic cracking process wherein a heavy hydrocarbon feed comprising hydrocarbons having a boiling point above about 650° F. is catalytically cracked to cracked products comprising the steps of: catalytically cracking said feed in a catalytic cracking zone operating at catalytic cracking conditions by contacting said feed with a source of hot regenerated cracking catalyst to produce a cracking zone effluent mixture having an effluent temperature and comprising cracked products and spent cracking catalyst containing coke and strippable hydrocarbons; separating said cracking zone effluent mixture into a cracked product vapor phase having a temperature above about 950° F. and a spent catalyst rich phase; stripping and regenerating said spent catalyst to produce regenerated catalyst which is recycled to crack heavy feed; removing said cracked product vapor phase via a transfer line having an inside diameter and connective with a main fractionator which recovers liquid product fractions from said cracking zone effluent; the improvement comprising quenching in a quench zone in an upstream portion of said transfer line said cracked product vapor by injection of a quench liquid derived from said main fractionator into said transfer line via a plurality of spray nozzle means having an inlet for the quench liquid, an inlet for an atomizing steam stream, and a nozzle discharge outlet which provides a uniform distribution of quench liquid in a conical pattern having an angle of spray of 30 to 90 degrees, said quench nozzles being radially distributed about the transfer line and inserted into the transfer line so that the discharge end of the nozzles are within 0.05 to 0.25 pipe diameters of the transfer line, and the angle of insertion of the nozzles relative to a line parallel to the transfer line is approximately one half the angle of the conical spray pattern, and adding quench liquid in an amount and at a temperature sufficient to reduce the temperature of the cracked product vapor in said transfer line by at least 30° F. and to vaporize at least 90% of the injected product liquid, wherein the amount of thermal cracking, as measured by Equivalent Reaction Time at 800° F., in said transfer line is reduced by at least 50%.

BRIEF DESCRIPTION OF THE DRAWINGS

FIG. 3 is a simplified schematic view of a preferred vapor line quench pipe detail, with steam purge around the nozzle.

DETAILED DESCRIPTION OF THE INVENTION

Figure 1:
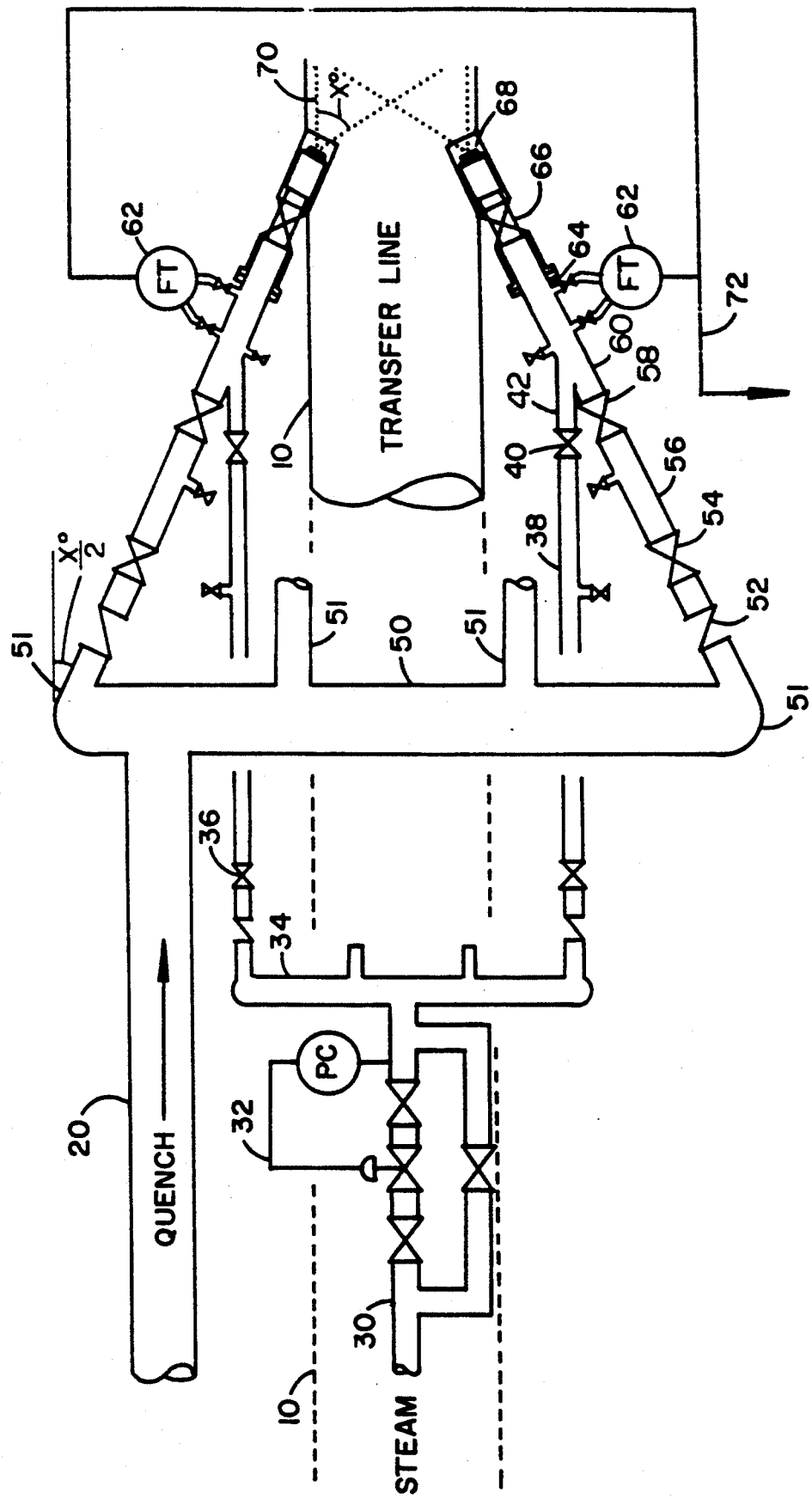
FIG. 1 is a simplified schematic view of a spray distributor of the invention adapted for use in quenching a hot vapor line associated with an FCC unit.

In FIG. 1, hot cracked products, from an FCC reactor not shown, pass through transfer line 10. This is usually an extremely large line in commercial FCC units, on the order of 30 to 60". The hot vapor is typically at about 1000° F., and usually the vapor contains a lot of catalyst "fines", typically 1,000 to 5,000 pounds per day of catalyst fines are present in the hot vapor. The problems of corrosion and erosion in such service are severe.

In the embodiment shown, a quench fluid is passed through line 20 for use in quenching or cooling the hot vapor in the transfer line. The quench liquid will usually be a hydrocarbon liquid obtained by fractionating the cracked vapor product into various fractions. Preferred liquid product fractions include naphtha or gasoline boiling range liquid, light cycle oil, heavy cycle oil, and main columns bottoms. Other quench fluids such as water, light hydrocarbons, liquid streams derived from other processes which are compatible with the cracked product, etc.

The quench liquid is passed via distributor 50 to a plurality of liquid quench distributors. Preferably at least three quench inlets are provided, most preferably at least six. FIG. 1 represents use of six quench connections, though only the uppermost and lowermost quench systems are shown in much detail.

Each quench system consists of a line 51 connective with the a header or distributor of quench liquid, a preferred but optional check valve 52, valve 54, length of pipe 56, valve 58, a length of pipe 60 connective with a source of atomization gas or steam from line 42. The combined quench liquid and atomization gas pass via length of pipe 64 through another block valve 66, to spray nozzle 68.

The spray nozzles contemplated for use herein are very efficient at producing a cone of finely and uniformly divided spray, but only when enough energy is available to generate the spray. Although this energy can be provided solely by high pressure in the quench liquid line, it is usually preferred to supply much of this energy with an atomizing gas, preferably medium pressure steam, which is supplied via steam line 30, double block and bleed steam pressure control section 32, steam header 34, supply lines 36, line 38, shut off or control valve 40 and line 42 connective with the quench system.

The mechanics of getting a good supply of steam at constant pressure, and supplying quench liquid to each nozzle form no part of the present invention, and myriad alternatives are available to get a quench liquid and atomizing steam to a quench nozzle.

The quench nozzles should be radially distributed about the vapor line. The vapor line can be horizontal as shown, or vertical, with vapor flow up or down, and with quench spray co-current (as shown) or counter-current to vapor flow. In catalytic cracking units, the arrangement shown is preferred.

By radially distributing the quench nozzles, and by using eight nozzles with 60 degree spray patterns, multiple, overlapping spray patterns are provided which ensure efficient contact of quench liquid with the vapor flowing through the transfer line. The nozzles are aligned so that the side of the cone pattern nearest the wall is parallel to the wall, or preferably is divergent from the wall.

Packing glands, with steam purges in the sleeves, allow for nozzle removal, for replacement or repair.

Spray nozzles usually have a limited turn-down ratio, i.e., they work best over a moderately narrow flow range. Using multiple nozzles, radially distributed, with overlapping flow patterns, one or more nozzles may be shut down completely, so that flow through the remaining nozzles will be high enough to achieve a good cone pattern. It saves atomizing steam to use, e.g., four nozzles at full flow, and have four of the nozzles shut in than to use all eight nozzles at 50% of flow.

Preferably the nozzles extend into the flow line no more than about 10% of the ID of the transfer line. This minimizes disruption of flow in the transfer line, and maximizes the swept volume of the spray cone pattern.

Other cone patterns can be used, with a smaller or larger angle of spray. The essential thing with spray cone angles is that the cones overlap, preferably there is 100% overlap, so that at least half of the nozzles can be taken out of service while still providing for complete coverage of the fluid passing through the transfer line.

Flow transmitters, shown as FT in FIG. 1 allow the operation of each spray nozzle may be monitored. Careful monitoring of the flow to individual nozzles provides information on whether or not a nozzle is plugged. Use of flow transmitters to monitor nozzle operation is not, per se, any part of the present invention. It is well known, and further discussion thereof is not necessary.

Figure 2:
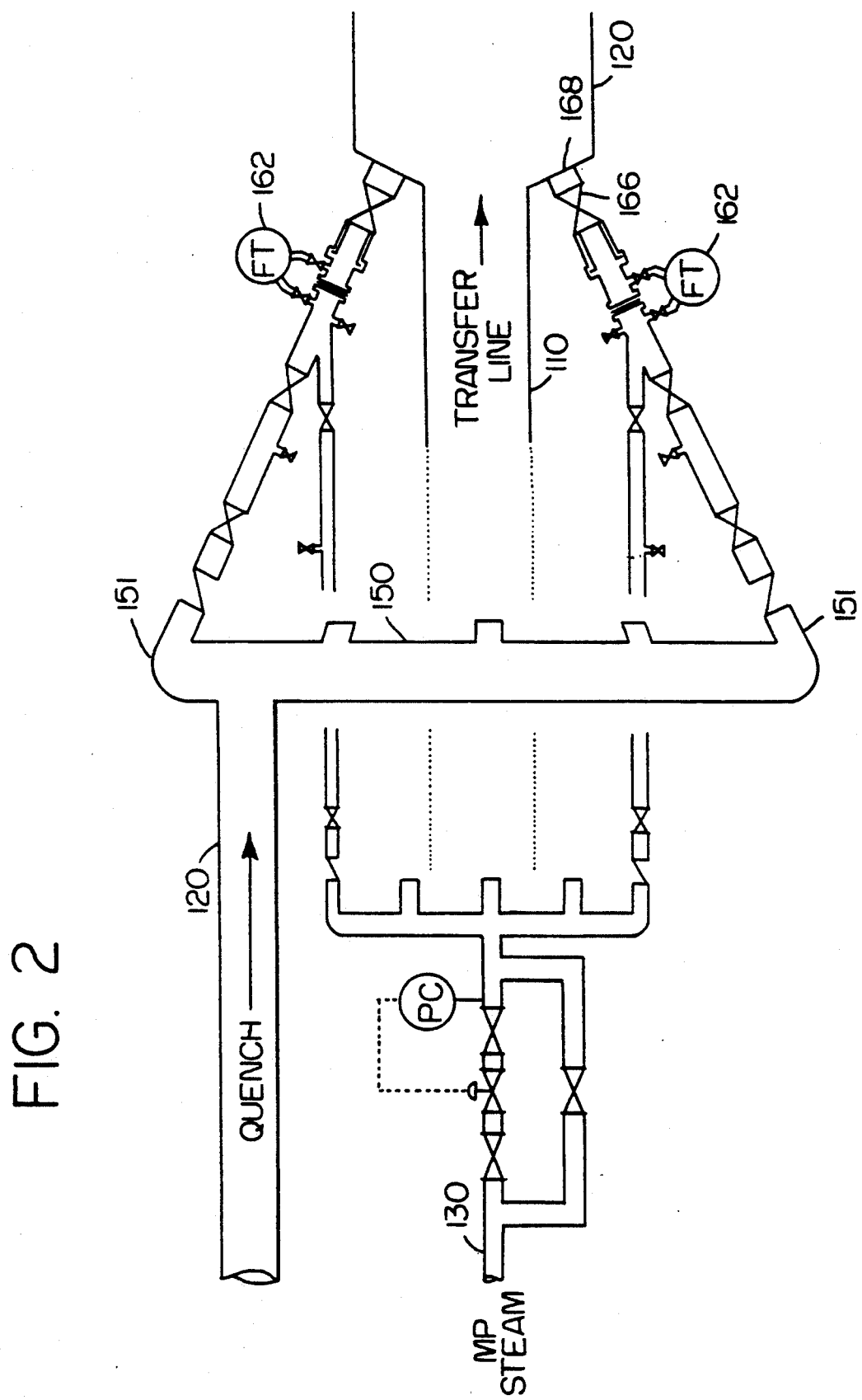
FIG. 2 is a simplified schematic view of a preferred spray distributor of the invention, with an line diameter at the point of liquid quench injection.

In FIG. 2, the only significant change is the widening, thus the enlarged portion defined by the enlargement 120 of the [quench] transfer line has an enlarged diameter relative to the upstream portion 110.

The quench liquid added via line 120 and distributor 150 and lines 151, and the steam system starting with steam in line 130, all function as in the FIG. 1 embodiment. A two phase mixture is sprayed from multiple nozzles 168 radially distributed about the enlarged portion 120 of the transfer line.

The transfer line is enlarged to reduce or eliminate the amount of coking that occurs on the sidewalls of enlarged transfer line 120. Enlarging the line, and adding quench spray as shown in the FIG. 2, ensures that the hot cracked vapor in line 110 will be completely quenched before the hot vapor, and added quench liquid, can contact the walls of region 120. If the possibility of some coke buildup occurring, because the walls of the transfer line 110 are at about the same temperature as the hot vapor flowing through the line. If any liquid is deposited on these hot metal surfaces it can coke. Enlarging the transfer line, as shown in FIG. 2, allows the walls of the transfer line 120 to run at a cooler temperature, so coking can be avoided.

In FIG. 3, the full cone nozzle 168, used in FIG. 2, is shown in a preferred configuration.

Now that the invention has been briefly reviewed in conjunction with the FIGURES, a more detailed discussion of the invention, when used in conjunction with quenching of a transfer line from an FCC unit, follows.

FCC FEED

Any conventional FCC feed can be used. The process of the present invention is especially useful for processing difficult charge stocks, those with high levels of CCR material, exceeding 2, 3, 5 and even 10 wt %CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650° F.

The most uplift in value of the feed will occur when at least 10 wt %, or 50 wt % or even more of the feed has a boiling point above about 1000° F., or is considered non-distillable.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Good additives for removal of SOx are available from several catalyst suppliers, such as Davison's "R or Katalistiks International, Inc.'s "DeSox."

CO combustion additives are available from most FCC catalyst vendors.

The FCC catalyst composition, per se, forms no part of the present invention.

CRACKING REACTOR CONDITIONS

Conventional catalytic cracking conditions may be used, in either a fluid bed or fixed bed cracking reactor. Fluid bed cracking is preferred. Typical FCC riser cracking reaction conditions include catalyst/oil ratios of 0.5:1 to 15:1 and preferably 3:1 to 8:1, and a catalyst contact time of 0.5-50 seconds, and preferably 1-20 seconds, and riser top temperatures of 900° to about 1050° F.

The process of the present invention tolerates and encourages use of unconventional reactor conditions. Riser top temperatures of 1100° F., 1150° F., 1200° or even higher can be tolerated in the process of the present invention, and are preferred when the feed is heavy, and contains 10% or more of resid. Unusually short riser residence times are possible at such high temperatures, so riser hydrocarbon residence times of 0.1 to 5 seconds may be used., e.g., 0.2 to 2 seconds.

It is preferred, but not essential, to use an atomizing feed mixing nozzle in the base of the riser reactor, such as ones available from Bete Fog. More details of use of such a nozzle in FCC processing is disclosed in U.S. Ser. No. 229,670, which is incorporated herein by reference.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 4,502,947 to Haddad et al., which in incorporated by reference.

It is preferred, but not essential, to use a hot catalyst stripper. Hot strippers heat spent catalyst by adding some hot, regenerated catalyst to spent catalyst.

The FCC reactor and stripper conditions, per se, can be conventional. In many refineries, the existing reactor and stripper can be left untouched, and the unit modified by adding the spray nozzles of the present invention intermediate the vapor outlet from the reactor section and the main column.

CATALYST REGENERATION

The process and apparatus of the present invention can use conventional TCC or FCC regenerators. The regenerator, per se. forms no part of the present invention. In most units, the existing regenerator will be used to practice the present invention.

CO COMBUSTION PROMOTER

Use of a CO combustion promoter in the regenerator or combustion zone is not essential for the practice of the present invention, however, it is preferred. These materials are well-known and disclosed in U.S. Pat. No. 4,072,600 and U.S. Pat. No. 4,235,754, which are incorporated by reference.

COMPARISON OF ESTIMATED YIELDS

The benefits of practicing the present invention can most easily be seen by comparing the yields obtainable in a conventional, prior art FCC unit versus an estimate of the yields obtainable in the same unit by adding a quench section in the transfer line near the riser reactor outlet.

ESTIMATE 1—PRIOR ART

The prior art unit estimate is based on yields obtainable in a conventional unit operating with a riser reactor, a high efficiency regenerator, and a conventional catalyst stripper.

The reactor conditions included:
Riser Top Temperature=1000° F.
Riser Top pressure=32 psig
Cat:Oil Weight Ratio=6.5:1

The reactor discharged into a plenum having a volume of 2,154 cubic feet. The transfer line had a volume of 3,291 cubic feet, and was about 225 feet of 54" OD line.

The feed a specific gravity of 0.9075.

Under these conditions, the unit achieved a 76.11 vol % conversion of feed.

The following yield estimate is presented in three parts. The first or base case is with no changes. The second eliminates the plenum, but does not quench. The third (invention) eliminates the plenum and quenches the reactor effluent vapor within 10 or 20 feet of the reactor outlet, to a temperature of 700°-800° F. using a heavy quench liquid such as LCO, HCO or Main Column Bottoms injected at about 520° F. through an in-line peripheral nozzle arrangement shown in the FIG. 1 or 2. A similar quenching effect could be achieved using liquid wiers, a single spray nozzle, etc., but the quenching section of the transfer line would have to be a longer, and the quench section would be more likely to plug and harder to service.

| TRANSFER LINE QUENCHING STUDY | | | |
|---|---|---|---|
| CASE: | BASE | NO PLENUM | QUENCH |
| Conversion, Vol. % - - = | 76.11 | −0.10 | −0.23 |
| Gasoline Yield, Vol % | 58.12 | 0.16 | 0.39 |
| Gasoline Octane, RONCL | | −0.09 | −0.31 |
| C2 and lighter wt % | 4.22 | −0.10 | −0.08 |
| C3 + C4 olefins, vol % | 15.06 | −0.15 | −0.37 |
| iC4 vol % | 5.32 | 0.01 | 0.02 |
| Light Fuel Oil | 18.27 | 0.16 | 0.39 |
| Heavy fuel Oil | 5.62 | −0.06 | −0.16 |
| G + D vol % | 76.39 | 0.32 | 0.80 |
| Coke (weight %) | 5.12 | -0- | -0- |

This shows a decrease in thermal cracking. The ERT, or equivalent reaction time at 800° F. has been significantly reduced. This reduction in thermal cracking increases yields of valuable liquid product, and improves product quality. There is a slight decrease in gasoline octane number because thermal cracking produces olefinic gasoline which has a good octane number. Thermal cracking also reduces yields of gasoline.

The process of the invention (eliminating the reactor plenum, and quenching in the transfer line) increases G+D yields, or gasoline plus distillate yields, by about 0.80 vol %. In the commercially sized unit which was the basis for this study, processing 96.5 thousand barrels per day of feed, the practice of the present invention results in an increase of 772 barrels of gasoline and distillate product.

In FCC applications, the process and apparatus of the present invention allows higher riser top temperatures which lead to other benefits which are not reflected in the above yield estimates.

Vaporization of all feeds, and especially of resids, is favored by higher reactor temperatures. Much of the base of the riser is devoted to vaporizing the feed, and operating with higher riser temperatures allows more of the riser to be used for vapor phase cracking, rather than vaporization of liquid.

Higher riser top temperatures allow more heat to be removed from the FCC unit with the cracked products. Less heat must be removed in the regenerator. This helps to keep the unit in heat balance. This heat is eventually recovered in downstream fractionators or heat exchangers.

Catalyst stripping will be slightly better at higher temperatures, so higher riser top temperatures will improve somewhat the stripping operation.

If practicing the invention today, we would quench in the transfer line using eight nozzles spaced 45 degrees apart around the transfer line periphery, with the transfer line being enlarged at the point of quench liquid injection. We would use nozzles from Bete Fog, which produce a 60 degree full cone spray pattern. These nozzles would be installed so that one side of the cone is parallel to the pipe wall, or is slightly divergent from the pipe wall, to delay to the maximum extent possible contact of cool quench liquid with a hot wall surface. Steam on pressure control will be injected upstream of the nozzles to maintain design pressure drop and ensure good atomization. Provisions should be made to allow nozzles to be blocked in individually to conserve steam usage. Packing glands will allow for nozzle removal and servicing while on line. Nozzle sleeves should be constantly purged with steam to prevent coke formation.

It may be beneficial in some instances to use a quench zone lined with ceramic or teflon or some other non-sticking material. This will minimize growth of coke deposits on the walls of the quench zone.

We claim:

1. A method of contacting a flowing gas stream in a generally tubular length of pipe having a pipe wall and a pipe inside diameter with a liquid comprising:
   a. passing said gas through said pipe and providing radially distributed about said pipe a plurality of spray nozzle means having an inlet for a liquid to be injected into the flowing gas stream, an inlet for an atomizing fluid, and a nozzle discharge outlet which provides a uniform distribution of liquid droplets in a conical pattern having an angle of spray of 30 to 90 degrees; and wherein each spray nozzle means is connective with the pipe via packing glands having sleeves which allow for nozzle removal and with steam purges connective with the sleeves;
   b. radially spraying said liquid to contact said flowing gas via said spray nozzle means about the length of pipe and inserting the spray nozzle means into the pipe so that the discharge ends of the nozzles are within 0.05 to 0.25 pipe diameters of the pipe wall, and the angle of insertion of the nozzles relative to a line parallel to the length of the pipe is no more than approximately one half the angle of the conical spray pattern.

2. The method of claim 1 wherein at least six spray nozzles are provided.

3. The method of claim 1 wherein each nozzle has a spray pattern of 60 degrees and the angle of insertion of each nozzle is 30 degrees.

4. The method of claim 1 wherein each spray nozzle comprises at least one flow transmitter which indicates flow through the spray nozzle whereby nozzle operation may be monitored by monitoring of flow rate.

5. The method of claim 1 wherein the flowing gas is a hot vapor stream of catalytically cracked product and the liquid is a quench stream comprising a liquid product obtained by fractionating said catalytically cracked product.

6. The method of claim 1 wherein the flowing gas is a visbroken stream being charged to a fractionator and the visbroken stream is quenched upstream of the fractionator by spraying a liquid quench stream comprising a liquid product obtained by fractionating said visbroken product.

7. The method of claim 1 wherein flowing gas is acidic or alkaline vapors flowing through a vent line and the liquid is a neutralizing liquid.

8. An apparatus for contacting a flowing gas stream in a generally tubular length of pipe having a pipe wall and a pipe inside diameter with a liquid comprising:

a plurality of radially distributed spray nozzle means having an inlet for a liquid to be injected into the flowing gas stream, an inlet for an atomizing fluid, and a nozzle discharge outlet means which provides a uniform distribution of droplets in a conical pattern having an angle of spray of 30 to 90 degrees and wherein each spray nozzle means is connective with the pipe via a packing gland means having a sleeve means which allows for nozzle removal and with purge means connective with the sleeve means;

wherein said spray nozzle means are inserted into the pipe so that the discharge ends of the nozzles are within the pipe and within 0.05 to 0.25 pipe diameters of the pipe wall, and wherein the angle of insertion of the nozzles relative to a line parallel to the length of the pipe is approximately one half the angle of the conical spray pattern means, whereby at least a portion of the pattern of the conical spray pattern is parallel to and within 0.05 to 0.25 pipe diameters of the pipe wall;

and wherein the number of spray nozzle means, and the angle of the conical spray pattern of each nozzle are sufficient to provide at least 100% overlap of conical spray patterns within said pipe.

9. The apparatus of claim 8 wherein at least six spray nozzle means are provided.

10. The apparatus of claim 8 wherein each nozzle means produces a spray pattern of 60 degrees and the angle of insertion of each nozzle into the pipe is 30 degrees.

11. The apparatus of claim 8 wherein each spray nozzle means comprises at least one flow transmitter which indicates flow through the spray nozzle means whereby nozzle operation may be monitored by monitoring of said flow rate.

12. In a fluidized catalytic cracking process wherein a heavy hydrocarbon feed comprising hydrocarbons having a boiling point above about 650° F. is catalytically cracked to produce cracked products comprising the steps of:

a. catalytically cracking said feed in a catalytic cracking zone operating at catalyst/oil ratios of 0.5:1 to 15:1, a catalyst contact time of 0.2 to 50 seconds, and riser top temperatures of about 950° to about 1200° F. by contacting said feed with a source of regenerated cracking catalyst to produce a cracking zone effluent mixture having a temperature of about 950° to about 1200° F. and comprising cracked products and spent cracking catalyst containing coke and strippable hydrocarbons;

b. separating said cracking zone effluent mixture into a cracked product vapor phase having a temperature above about 950° F. and a spent catalyst rich phase;

c. stripping and regenerating said spent catalyst to produce regenerated catalyst which is recycled to crack heavy feed;

d. removing said cracked product vapor phase via a transfer line having an inside diameter and connective with a main fractionator which recovers liquid product fractions from said cracking zone effluent;

e. quenching in a quench zone in an upstream portion of said transfer line said cracked product vapor by injection of a quench liquid derived from said main fractionator into said transfer line via a plurality of spray nozzle means having an inlet for the quench liquid, an inlet for an atomizing steam stream, and a nozzle discharge outlet which provides a uniform distribution of quench liquid in a conical pattern having an angle of spray of 30 to 90 degrees, said quench nozzles being radially distributed about the transfer line and inserted into the transfer line so that the discharge end of the nozzles are within 0.05 to 0.25 pipe diameters of the transfer line, and the angle of insertion of the nozzles relative to a line parallel to the transfer line is approximately one half the angle of the conical spray pattern, and adding quench liquid in an amount and at a temperature sufficient to reduce the temperature of the cracked product vapor in said transfer line by at least 30° F. and to vaporize at least 90% of the injected product liquid, wherein the amount of thermal cracking, as measured by Equivalent Reaction Time at 800° F., in said transfer line is reduced by at least 50%.

13. The process of claim 12 wherein the quench liquid is an aromatic hydrocarbon stream derived from the main column and selected from the group of naphtha, light cycle oil, heavy cycle oil, main column bottoms, and mixtures thereof.

14. The process of claim 13 wherein the quench liquid is cooled by heat exchange prior to injection into the quench zone.

15. The process of claim 13 wherein the reactor cracked product vapor has a temperature of at least 1000° F., the quench zone liquid is selected from the group of light cycle oil, heavy cycle oil and main column bottoms, and is injected at a temperature of about 500°-600° F. to produce a quench zone effluent temperature of about 700°-800° F.

* * * * *